United States Patent [19]

Sato et al.

[11] Patent Number: 4,589,296
[45] Date of Patent: May 20, 1986

[54] POWER TRANSMISSION MECHANISM

[75] Inventors: Osamu Sato, Saitama; Kazuo Yamaguchi, Tokyo, both of Japan

[73] Assignee: Honda Giken Kogyo Kabushiki Kaisha, Tokyo, Japan

[21] Appl. No.: 742,641

[22] Filed: Jun. 10, 1985

Related U.S. Application Data

[63] Continuation of Ser. No. 444,254, Nov. 23, 1982.

[30] Foreign Application Priority Data

Dec. 2, 1981 [JP] Japan .................. 56-193999

[51] Int. Cl.$^4$ .......... F16H 57/00; F16H 1/02; F16D 23/10; F16D 43/24
[52] U.S. Cl. ................. 74/411; 74/412 TA; 192/104 R; 192/103 A
[58] Field of Search ............ 74/411, 412 TA; 474/94; 192/106.2, 104 R, 103 A, 105 B, 20

[56] References Cited

U.S. PATENT DOCUMENTS

| | | | |
|---|---|---|---|
| 1,167,850 | 1/1916 | Smith | 192/104 R |
| 2,002,699 | 5/1935 | Carsen | 192/103 A |
| 2,322,719 | 6/1943 | Scott | 74/411 |
| 2,407,144 | 9/1946 | Edwards | 74/411 |
| 2,688,882 | 9/1954 | Alexy | 74/411 |
| 2,907,433 | 10/1959 | Maurice et al. | 192/104 R |
| 2,928,288 | 3/1960 | Bliss et al. | 74/411 |
| 3,017,004 | 1/1962 | Fawick | 192/105 R |
| 3,268,046 | 8/1966 | Hirano | 192/103 A |
| 3,275,113 | 9/1966 | Hirano | 192/103 A |
| 3,359,817 | 12/1967 | Veillette et al. | 74/411 |
| 3,443,449 | 5/1969 | Kotarski | 74/411 |
| 3,536,173 | 10/1970 | Merkert | 192/103 A |
| 3,661,027 | 5/1972 | Gattesco | 74/411 |
| 3,851,532 | 12/1974 | Pflüger et al. | 192/104 R |

FOREIGN PATENT DOCUMENTS

| | | | |
|---|---|---|---|
| 462115 | 3/1937 | United Kingdom | 74/411 |
| 866046 | 7/1961 | United Kingdom | 192/104 R |
| 2056019 | 3/1981 | United Kingdom | |

Primary Examiner—Lawrence J. Staab
Assistant Examiner—Michael D. Bednarek
Attorney, Agent, or Firm—Sughrue, Mion, Zinn, Macpeak, and Seas

[57] ABSTRACT

A power transmission system having a resilient buffer to prevent generation and transmission of vibrations between gears below a predetermined rotational speed. A plate is mounted for relative circular movement on a driven gear and contains buffer springs to damp vibrations until positive engagement results. A clutch mechanism surrounds the buffer disk and uses a rotating ramp surface with centrifugally actuated caged members to separate the clutch from the gear above a predetermined speed.

10 Claims, 11 Drawing Figures

POWER TRANSMISSION MECHANISM

This is a continuation, of application Ser. No. 444,254, filed 11/23/82.

BACKGROUND OF THE INVENTION

This invention relates to a mechanism for transmitting power from a driving side to a driven side. For example, the invention relates to a power transmission mechanism which is provided with a buffer having a predetermined buffering characteristic by interposing a buffer member such as rubber or a spring member between the driven side which is a magnet rotor shaft for rotating a heavy rotor such as electric generator and the driving side which is a generator idly fitted onto this rotor shaft.

For example, referring to FIG. 1, in a power transmission mechanism for a motorcycle or the like, the power of an engine 1 is transmitted to a gear 5 at the side of a speed change gear by way of a gear 3 and a chain 4 from a crank shaft 2. Reference numeral 6 denotes a flywheel. In this case, a force is generated by which the vehicle body is swung right and left as the rotation of the engine becomes high or low in what is called "an engine of a longitudinally set type" in which the crank shaft 2 is arranged in the forward and rearward direction of the vehicle body. Stated differently, as the engine is abruptly accelerated or decelerated, the angular acceleration component of rotation increases, thereby causing a torque of inertia which swings the vehicle body right and left. It has been known to rotate the magnet rotor shaft 8 of the generator 7 in a direction opposite to that of the crank shaft 2 by means of a pair of gears 9, 10 for driving the generator, to null this force.

There is also in the art an anti-torque balancer. Specifically, a driving gear 3 is directly coupled to the crank shaft 2. A driven gear 10 is directly coupled to the rotor shaft 8 of the generator 7 having a large moment of inertia. Both of the gears are made to engage each other so that the rotor shaft 8 of the generator 7 may rotate in a direction which is opposite to that of the crank shaft 2, thereby generating an inertia torque in a direction which is opposite to an inertia torque of the crank shaft 2 on the rotor shaft 8 of the generator.

However, the gas pressure functions on an engine piston must also be considered. It varies by a large margin in correspondence with each stroke. Accordingly, an inertia force in a reciprocating part in an internal combustion engine is created and a periodical torque variance is caused. Consequently, forced torsional oscillation power is developed by this variance of torque.

A vibration component, noise and the like, for example, due to the collision between the gears which is attributable to the engagement of the gears or the like is apt to be created in the middle and high speed rotation regimes of the engine because the rotor shaft 8 which is relatively heavy is rotated by means of the gears 9 and 10. Then, the rotation of the gear 10 is transmitted to the rotor shaft 8, for example, by way of buffer members 11 made of an elastic member such as coiled spring, rubber or the like (FIG. 2). However, the variance in the speed is apt to be created in the low speed rotation regime. Also, circumferential slippage between the gear 10 and the gear shaft 8 frequently occurs, so that the gear 10 resonates to develop vibration or noise which also becomes a problem.

If the torsional oscillation frequency of the crank shaft coincides with, or approaches, a characteristic frequency which is determined by the moment of inertia of the rotor shaft system of the generator 7 and the composite spring constant of this rotor shaft 8 and the spring, resonance is caused, thereby making it impossible to achieve the buffering action.

Furthermore, the torque of inertia in the system of the rotor shaft 8 of the generator is small when the crank shaft is rotating at a low speed. Conversely, since the variance in the rotation speed of the crank shaft, that is, the angular acceleration of the crank shaft 2 is relatively large, if the above-mentioned buffer is operative, the variance in the rotation speed of the crank shaft is absorbed by the buffer, so that the torque of inertia of the crank shaft is nulled by the rotor of the generator. This makes it impossible to effectively perform the essential function of the anti-torque balancer to prevent vibration of the vehicle body.

SUMMARY OF THE INVENTION

The present invention provides a gear system which is capable of effectively preventing the generation of the vibration, noise or the like which is attributable to the engagement of the gears or the like in a power transmission mechanism throughout the rotation range of the gears from low speed rotation to high speed rotation. In a gear system in accordance with this invention, a buffer is interposed between a gear and a gear shaft. Additionally, a clutch mechanism is utilized by which the gear and the gear shaft are in direct power-coupled at a rotation of the gear which is not higher than a predetermined rotation.

DETAILED DESCRIPTION OF THE PREFERRED EMBODIMENTS

Figure 1:
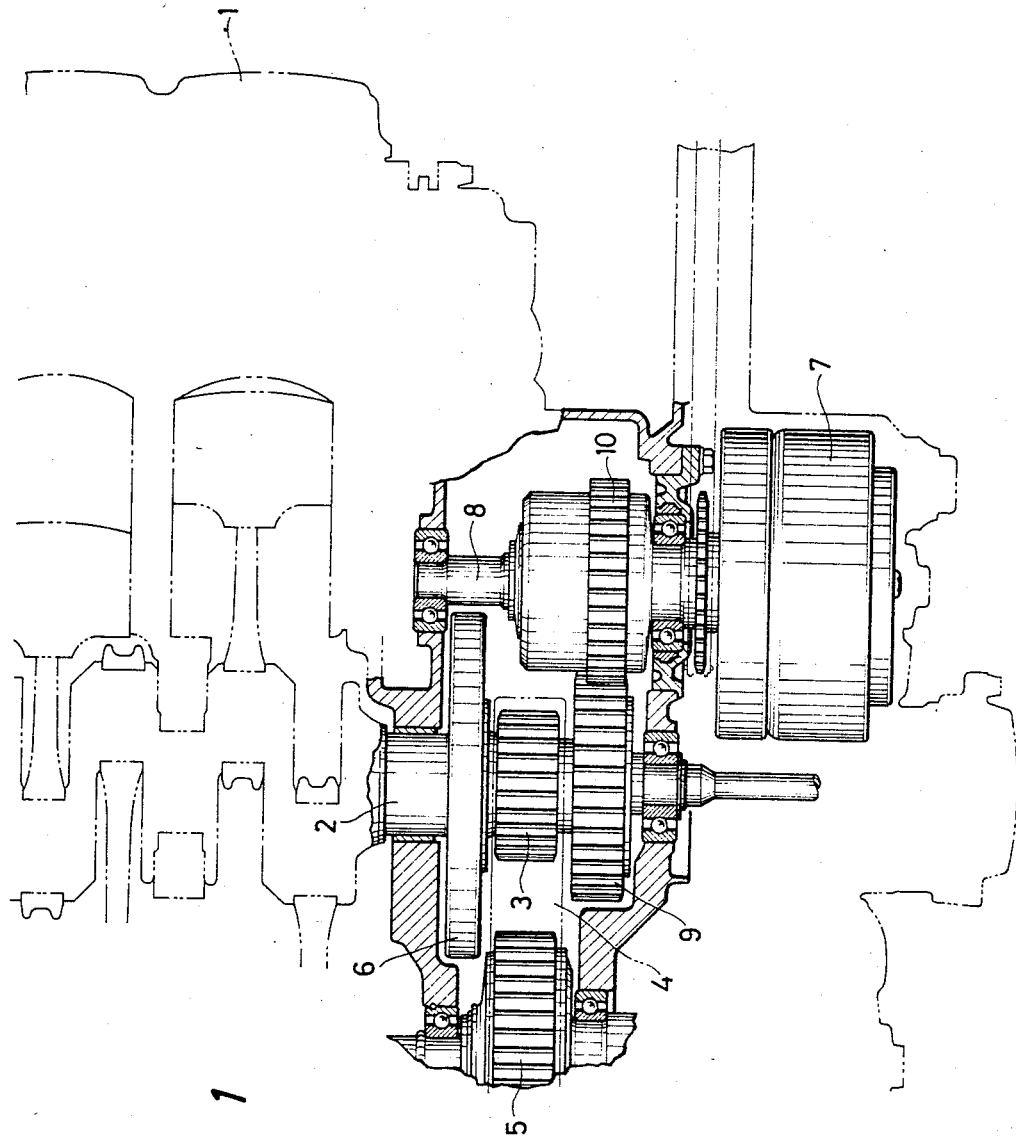
FIG. 1 is a transversal plan view showing one portion of a power transmission mechanism for a motorcycle or the like in an example in which a gear means in accordance with the present invention is applied to a gear for driving an electric generator.
Figure 2:
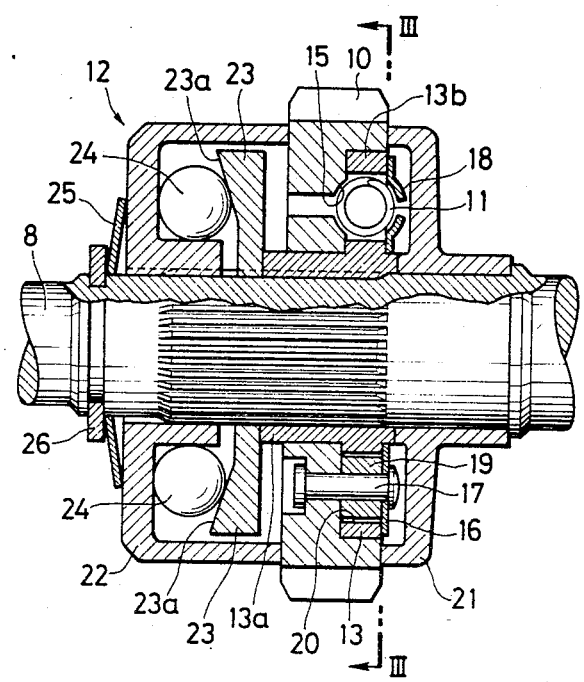
FIG. 2 is an enlarged cross-sectional view of the gear for driving the generator.
Figure 3:
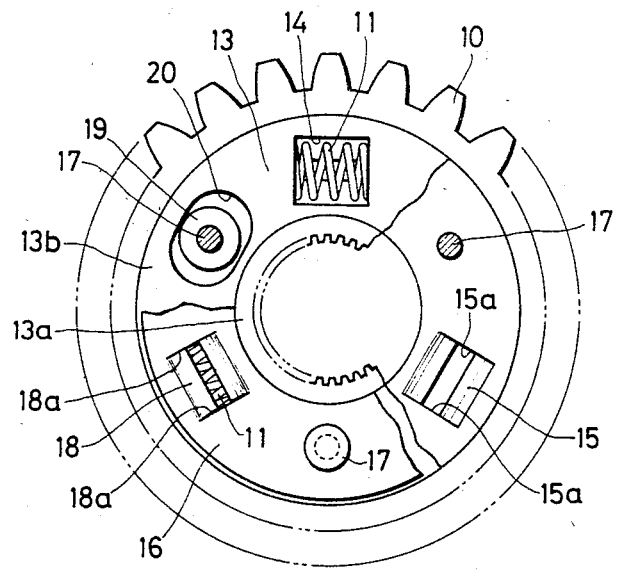
FIG. 3 is a partially cut away side elevation view thereof.

The drawings in FIGS. 1-3 show an example in which the gear system in accordance with the present invention is applied to the above-mentioned gear 10 for driving the generator. Reference numeral 1 denotes an engine of horizontally opposite and longitudinally set type, which is mounted on a motorcycle. A flywheel 6, a gear 3 for a speed change gear and a gear 9 for the generator are integrally fitted onto a crank shaft 2 of the engine 1. In addition, the gear 3 for the speed change gear is in communication with a gear 5 at the side of the speed change gear via a chain 4. The gear 9 for the generator is in engagement with the gear 10 for driving the generator which is arranged on a rotor shaft 8 of a rotor of the generator 7. Furthermore, the gear 10 for driving the generator is provided to be rotatable with respect to a flange 13b which is spline-coupled onto the rotor shaft 8. In addition, a cylindrical member 13 is relatively slidable axially with respect to the rotor shaft 8 due to the spline-coupling and rotatable and integral with the rotor shaft 8.

Figure 4:
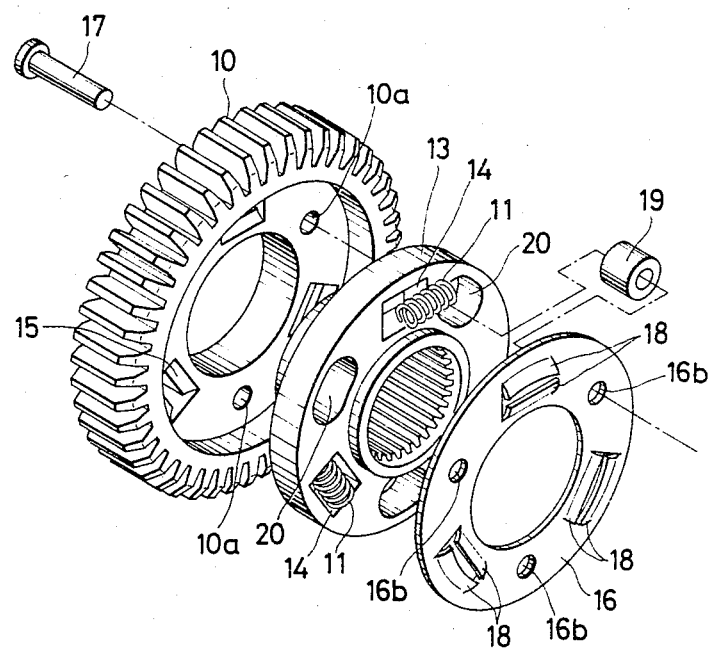
FIG. 4 is a disassembled perspective view showing the essential parts of the same embodiment.

A plurality of long through grooves 14 are formed in which buffer springs 11 are fitted. A plurality of oval grooves 20 have spacers 19 inserted in the cylindrical member 13 to be arranged on a common circle, as shown in FIG. 4. On the other hand, a plurality of recessed grooves 15 corresponding to the long grooves 14 are formed in the gear 10 and a plurality of pin holes 10a through which clevis pins 17 are passed are also formed in the gear 10 for driving the generator. The recessed grooves 15 and pin holes 10a are arranged respectively on a common circle on the gear 10.

A plurality of cut portions 18 are formed in disk 16 at locations to contact with the buffer springs 11. Pin holes 16b are also formed in disk 16.

The buffer springs 11 are interposed in respective space portions which are formed by the long grooves 14 in the cylinder member 13 and the recessed grooves 15 in the gear 10 for driving the generator. The spacers 19 are idly fitted in the oval grooves 20 formed in the cylinder member 13. The gear 10 for driving the generator, the cylindrical member 13 and the disk 16 are integrally fixed to one another by means of the clevis pins 17. However, the gear 10 and the cylinder member 13 are made rotatable relative to each other by a predetermined angle because of the oval grooves 20 in the cylinder member 13. Relative rotation is permitted until the spacers 19, which are fitted to the clevis pins 17 contact with the wall surfaces of the oval grooves 20.

A clutch mechanism 12 further comprises a pair of engaging members 21 and 22 which frictionally engage both the side surfaces of the gear 10, a disk 23 having a slope surface and spherical weights 24. One of the engaging members 21 is, for example, force-fitted onto the shaft 8 to be fixed thereto. The other of the engaging members 22 is, for example, spline-coupled thereto in such a way as to be axially slidable. The engaging member 22 is retained to be always pressed against the side surface of the gear 10 by an annular spring 25. The gear 10 is clasped between both the engaging members 21 and 22, so that the buffer members 11 may not directly function thereon at the time of low speed rotation which is not higher than a predetermined rotation speed.

In case there is an especially strong torque variance, the gear 10 and both the engaging members 21 and 22 properly slip to lessen the impact. The irregular rotation is decreased by the frictional force between the gear 10 and both the engaging members 21, 22 as far as the usual torque variance is concerned.

If the gear 10 rotates at a rate equal to or higher than the predetermined rotation, the weights 24 gradually move outwards along the ramp surface 23a of the disk 23 by centrifugal force. The engaging member 22 overcomes the spring force of the annular spring 25 to move back, that is, to the left in FIG. 2. Then, the pressing force of the engaging members 21, 22 against the gear 10 is gradually reduced. Finally, the frictionally engaged state thereof is released, so that the buffer members 11 work, thereby lessening the vibration, noise or the like attributable to the engagement of the gears 9, 10.

Although only one of the pair of engaging members 21 and 22 is made slidable, in the example as shown, member 22, it is also possible that both engaging members 21, 22 can be made slidable, and the disk 23 having a ramp surface 23a, the weights 24 and an additional spring 25 are provided on each of them. It is also possible that the surface of the engaging member which comes in contact with the weights has a different slope surface instead of providing the linear slope surface 23a in the disk 23. Reference numeral 26 denotes a retaining ring for preventing the spring 25 from moving axially out of position.

Figure 5:
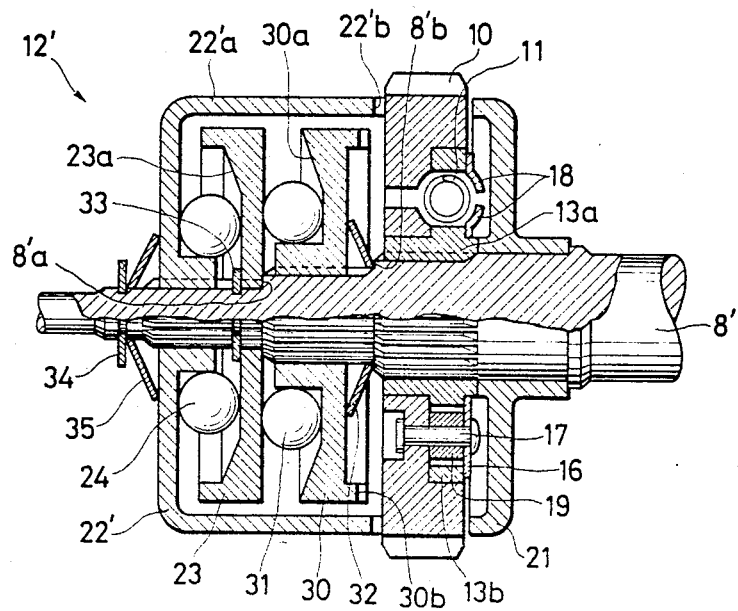
FIG. 5 is a side elevation view in longitudinal cross section showing a second embodiment when the engine is brought to a halt.
Figure 6:
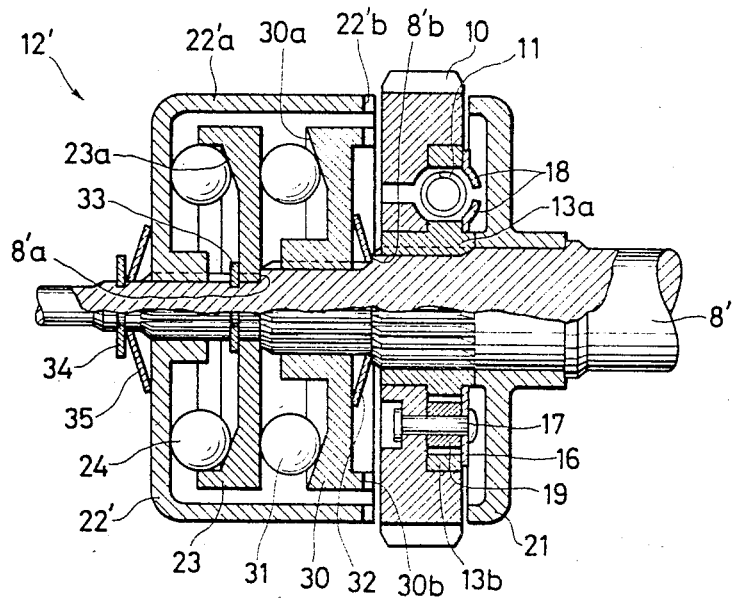
FIG. 6 and FIG. 7 are side elevation views in longitudinal cross section showing the second embodiment during middle speed rotation and high speed rotation regimes.
Figure 7:
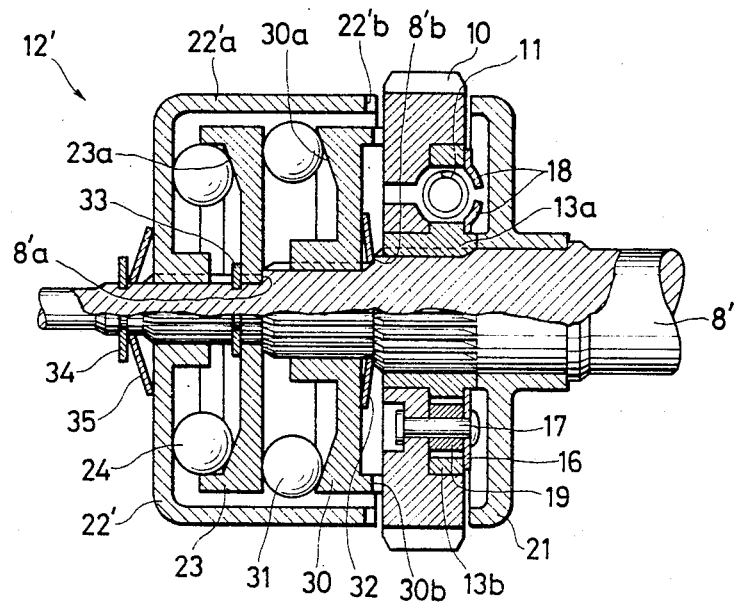

A second embodiment of the invention is shown in FIG. 5 through FIG. 7.

A clutch mechanism 12' comprises a pair of engaging members 21, 22', a ramp plate 23, a ramp engaging member 30, spherical weights 24 and 31 and an internal biasing spring 32.

One of the engaging members 21 is force-fitted onto the rotor shaft 8' to be integrally fixed thereto. The other engaging member 22' is spline-coupled to the rotor shaft 8'. The engaging member 22' is axially slidable on the rotor shaft 8' and rotatable integral with the rotor shaft 8'.

The ramp plate 23 and the ramp engaging member 30 are spline-coupled to the rotor shaft 8 to be clasped between the gear 10 for driving the generator and the engaging member 22' and surrounded by a cylindrical portion 22'a of the engaging member 22'. The ramp plate 23 is fixed in position by a circle clip 33 and a stepped cut portion 8'a of the rotor shaft 8.

In addition, a plurality of spherical weights 24 are fitted in a space which is surrounded by the ramp surface 23a of the plate 23 and the inside of the engaging member 22'. A plurality of spherical weights 31 are fitted in a space which is surrounded by the ramp surface 30a of the engaging member 30 and the other side of the plate 23. An internal biasing spring 32 is interposed between the other side of the sloped engaging member 30 and the stepped cut portion 8'b of the rotor shaft 8', so that the engaging member 30 is axially slidable against the spring force of the spring 32.

Furthermore, a circle clip 34 is fitted onto the rotor shaft 8 at a position outside the engaging member 22'. An annular retaining spring 35 is interposed between the circle clip 34 and the outside of the engaging member 22', so that the sliding contact surface 22'b of the engaging member 22' comes in sliding contact with the side surface of the gear 10 for driving the generator by the spring force of the spring 35.

An oil groove for preventing jamming (not shown) is formed in the sliding contact surface 22'b of the engaging member 22'. The spring 35 is formed thinner than the spring 32.

In the second embodiment shown in the drawings constituted as mentioned above, the spherical weights 24, 31 are positioned near the centers of the ramp surfaces 23a, 30a of the plate 23 and the engaging member 30. The sliding contact surface 22'b of the engaging member 22 is pushed against the side surface of the gear 10 by the spring force of the spring 35 as shown in FIG. 5, so that the gear 10, the engaging members 21 and 22' are frictionally engaged one another. Almost all of the torque which is applied to the gear 10 is directly transmitted to the rotor shaft 8', not by way of the buffer springs 11, but by way of the engaging members 21', 22'.

Consequently, any large variance in the rotation speed of the crank shaft 2 at the time of low speed rotation of the engine is prevented by the rotor 7 of the generator via the gear 9 for the generator, the gear 10 for driving the generator, the engaging members 21, 22' and the rotor shaft 8. Anti-torque absorption of the system is therefore effective.

The centrifugal force which works on the spherical weights 24, 31 increases in the case where the engine 1 is in the middle speed rotation regime, so that the weights 24, 31 gradually move towards the outer periphery of the engaging members 23, 30 along the ramp surfaces 23a, 30a thereof as shown in FIG. 6. In this case, since the spring 35 is formed in such a way as to be thin and soft in comparison with the spring 32, the engaging member 22' moves away from the gear 10, so that the sliding contact surface 22'b of the engaging member 22' moves away from the side surface of the gear 10 and the frictional engagement between the gear 10 and the engaging members 21, 22' is released. As a result, the buffer spring 11 effectively works, so that the impact force which is applied from the gear 9 for the generator onto the generator 10 for driving the generator is absorbed by the buffer spring 11, thereby preventing large stresses and noise from being caused in the gears 9 and 10.

Figure 8:
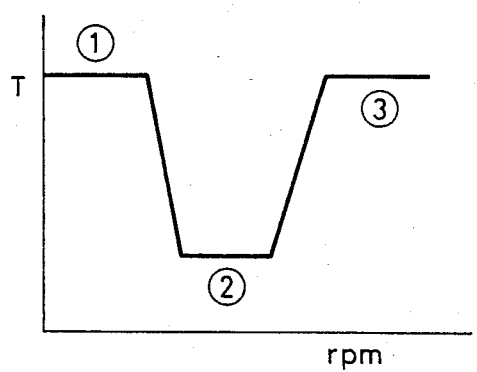
FIG. 8 is a graph showing the transmission torque in accordance with the second embodiment of this invention.

Furthermore, if the engine 1 rotates at a high speed so that the forced torsional frequency of the crank shaft 2 increases to approach the characteristic torsional frequency, determined by the moment of inertia of the rotor 7 of the generator and the composite spring constant of the buffer springs and the rotor shaft 8', the spring 32 is elastically deformed by the large centrifugal force which works on the weights 31 as shown in FIG. 8, so that the sliding contact surface 30b of the sloped engaging member 30 frictionally engages the side surface of the gear 10. The torque which is applied onto the gear 10 as well as the torsional oscillation are transmitted to the rotor shaft 8' not by way of the buffer springs 11 but, by way of the engaging member 21 and the ramp engaging member 30. Hence, resonance due to the coincidence of the forced torsional frequency of the crank shaft 2 and the characteristic torsional frequency is prevented.

The second embodiment has a characteristic of torque transmission as shown in FIG. 8. The anti-torque absorption effectively works in low speed rotation regime of the engine 1. During middle speed rotation 2 of the engine, the generation of noise between the gears 9 and 10 due to the forced torsional oscillation of the engine is prevented by the buffer function of the buffer springs 11. Furthermore, the resonance due to the coincidence of the characteristic frequency of the system of the rotor 7 of the generator and the forced torsional frequency of the crank shaft 2 is prevented during high speed rotation of the engine 3.

Since the gear 10 is in a direct power-coupled relationship to the gear shaft 8 by means of the cluch mechanism 12 during low speed rotation of the gear which is not higher than a predetermined rotation speed, in accordance with the present invention, the buffer members 11 do not directly function. Hence, it becomes possible to prevent the gear 10 from resonating to generate the vibration or the noise by the variance or the like of the rotation speed as mentioned above. And it is also possible to prevent the nonaligned engagement of the gears 9, 10.

During middle speed and high speed rotation which is not lower than the predetermined rotation speed, the above-mentioned cluch mechanism 12 is released, so that the buffer members 11 work to well lessen the vibration, noise and the like which are attributable to the engagement of the gears or the like. Hence, it becomes possible to obtain a gear system without the vibration, noise and the like in all the vibration range of the gear from the low speed rotation to the high speed rotation.

Figure 9:
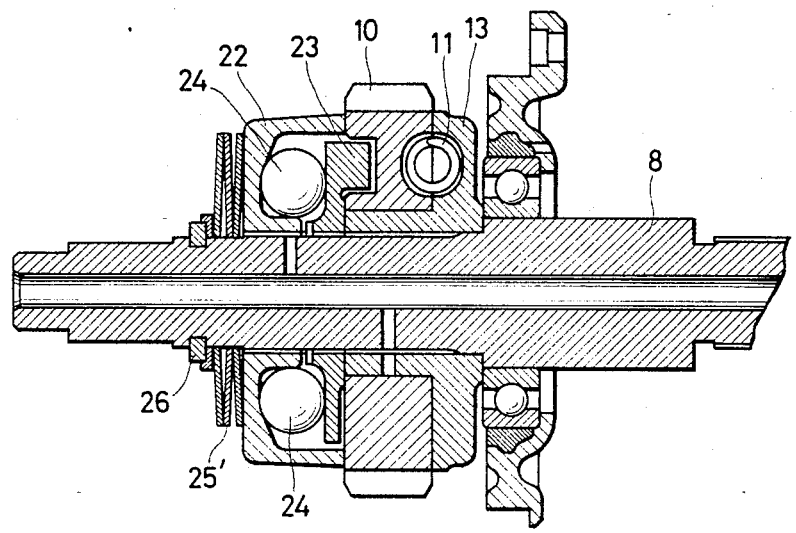
FIG. 9 is a side elevation views in longitudinal cross section showing a third embodiment of the present invention.
Figure 10:
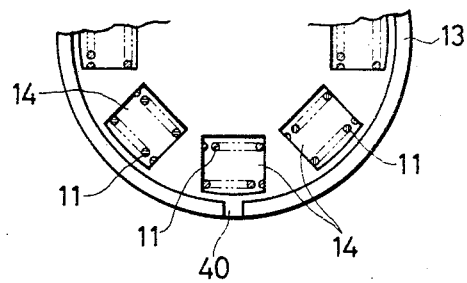
FIG. 10 is a plan view of a cylindrical member used in the third embodiment.
Figure 11:
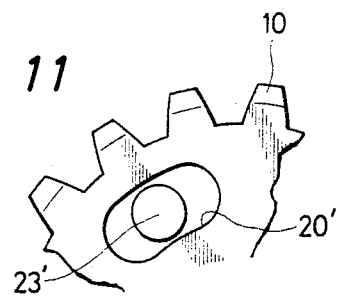
FIG. 11 is an illustration showing a positional relationship between a disk and a gear of the third embodiment.

A third embodiment of the invention is shown in FIGS. 9 to 11, wherein like parts and components are designated by the same reference numerals as those shown in the foregoing embodiments. According to the third embodiment, six buffer members 11 such as coil springs are accomodated between a gear 10 and a cylindrical member 13 as shown in FIGS. 9 and 10. Since the number of the buffer members 11 are increased to six, it becomes impossible to obtain sufficient space for forming oval grooves 20 in the cylindrical member to allow limited rotation of the gear 10. According to the third embodiment, a stop 23' is provided at a disk 23. The gear 10 has one disk surface formed with recesses 20' to accomodate the buffer members and an opposite surface formed with recesses to slidingly fit with the stop 23'. This construction is functionally equivalent to pin 17 spacers 19 and oval groove 20 of the foregoing embodiment. As shown the cylindrical member 13 has its sleeve portion formed with oil groove 40. Further in the third embodiment, three annular springs 25' are provided between a retaining ring 26 and an engaging member 22.

The power from the driving side is transmitted to the driven side by way of the buffer in accordance with the present invention. In the power transmission mechanism in which the buffer means is made inoperative in correspondence with the rotation frequency of the power transmission mechanism, the buffer is made inoperative only when the rotation frequency of the power transmission mechanism is outside the predetermined rotation frequency range. Consequently, the buffer becomes inoperative in the rotation frequency range where it is not required that the buffer is made operative or in the rotation range where it is not preferable that the buffer is made operative. This makes it possible to operate the instrument as an anti-torque balancer which is interposed in the power transmission mechanism as well as prevent resonance by the buffer.

What is claimed is:

1. A system for power transmission of a vehicle comprising:
   an internal combustion engine;
   a driving wheel of said vehicle connected to said engine;

a transmission mechanism including resilient buffer means and clutch means disposed in a juxtaposed manner relative to said buffer means;

gear power transfer means connected between said engine and one end of said transmission mechanism;

a rotary member;

a shaft connected between the other end of said transmission mechanism and said rotary member, said gear power transfer means always connected between said engine and said transmission mechanism, and said shaft always connected between said power transmission mechanism and said rotary member, said transmission mechanism transmitting rotational force from said engine to said rotary member during rotation of said engine, wherein said clutch means drivingly engages said first gear power transfer means so as to transmit the rotational force at a low range of engine rotation and wherein said clutch means is disengaged from said first gear power transfer means at a predetermined range of engine rotation such that the rotational force is transmitted through said buffer means.

2. A system of claim 1, further comprising:

a cylindrical member (13) fitted to said shaft (8), said cylindrical member securing therein said resilient buffer means, said gear power transfer means comprising a gear (10) rotatably mounted on said cylindrical member; and coupling means (17) extending between said gear and said cylindrical member to perform integral rotation therebetween, said cylindrical member being formed with an arcuate slot (20) to allow idle movement of said coupling member therein, so that integral rotation between said gear and said cylindrical member is prevented during idle movement.

3. The system of claim 2, wherein said resilient buffer means comprises a series of buffer springs (11) disposed on said cylindrical member and oriented on a common circle.

4. The system of claim 3, wherein said cylindrical member comprises a sleeve portion (13a) mounted on said rotary shaft for integral rotation therewith, and a flange portion (13b) connected to said sleeve portion, said flange portion being formed with holes (14) oriented on a common circle to receive said buffer springs and formed with said slot (20) to allow insertion of said coupling means.

5. The system of claim 2, wherein said cluch means has one end frictionally engageable with a side wall of said gear in response to rotation range outside of said predetermined range, to thus render said resilient buffer means inactive.

6. The system of claim 5, wherein said clutch means comprises first and second members (22 21) mounted on said rotary shaft, said first member (22) being positioned on one side of said gear and being axially movable, and said second member (21) being positioned on the other side of said gear, an end face (22b') of said first member being frictionally engageable with said side wall of said gear; and first means (35) to resiliently bias said first member toward said gear, said first means to bias being positioned at one side of said first member; and centrifugal actuated means responsive to the rotation of said rotor shaft to move said first member away from said gear face to allow buffering action of said resilient buffer means against biasing force of said first means to bias.

7. The system of claim 5, wherein said centrifugally actuated means comprises a disk (30) mounted on said rotary shaft and within said first member and having a ramp surface (30a); and a series of caged members (31) movable radially outwardly on said ramp surface in response to centrifugal force provided by the rotation of said rotary shaft to urge said first member away from said gear against biasing force of said first means to bias, when the rotation of said rotary shaft is at said predetermined range.

8. The system of claim 7, further comprising a second disk (23) mounted on said rotary shaft and positioned within said first member and having a second ramp surface (23a) and a second series of caged members (24) movable radially outwardly on said second ramp surface in response to centrifugal force provided by the rotation of said rotary shaft.

9. The system of claim 7, further comprising second means (32) to bias for allowing said first member to be brought into engagement with said side face of said gear when the rotation of the rotary shaft exceeds a second predetermined range, the biasing force of said second means to bias being smaller than that of said first means to bias.

10. The system of claim 8, further comprising second means (32) to bias for allowing said first member to be brought into engagement with said side face of said gear when the rotation of the rotary shaft exceeds a second predetermined range, the biasing force of said second means to bias being smaller than that of said first means to bias.

* * * * *